United States Patent
Chan

(10) Patent No.: US 11,088,623 B2
(45) Date of Patent: Aug. 10, 2021

(54) POWER SUPPLY DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/822,283

(22) Filed: Mar. 18, 2020

(65) Prior Publication Data

US 2021/0184582 A1    Jun. 17, 2021

(30) Foreign Application Priority Data

Dec. 11, 2019   (TW) ................................ 108145272

(51) Int. Cl.
*H02M 3/335* (2006.01)
*H02M 1/32* (2007.01)

(52) U.S. Cl.
CPC ......... *H02M 3/33523* (2013.01); *H02M 1/32* (2013.01)

(58) Field of Classification Search
None
See application file for complete search history.

(56) References Cited

U.S. PATENT DOCUMENTS

| 5,864,473 | A | * | 1/1999 | Slack | ............... | H02M 3/33546 |
| | | | | | | 363/21.08 |
| 8,710,745 | B1 | * | 4/2014 | Chang | ................... | H05B 45/50 |
| | | | | | | 315/127 |

FOREIGN PATENT DOCUMENTS

| CN | 207908899 U | * | 9/2018 |
| CN | 108644638 A | * | 10/2018 |

* cited by examiner

Primary Examiner — Jeffrey A Gblende
(74) Attorney, Agent, or Firm — McClure, Qualey & Rodack, LLP

(57) ABSTRACT

A power supply device includes an energy tank, a discharging and starting circuit, a fuse, a bridge rectifier, a transformer, a power switch element, an output stage circuit, and a controller. The energy tank includes an NTC (Negative Temperature Coefficient) thermistor. The energy tank absorbs a burst high voltage, and converts the burst high voltage into thermal energy. The discharging and starting circuit is coupled to the energy tank. The discharging and starting circuit includes a bypass path. When the resistance of the NTC thermistor is smaller than a threshold value, the bypass path is enabled, such that the energy tank is coupled through the bypass path to a ground and a ground voltage. The bridge rectifier is coupled through the fuse to the energy tank. The discharging and starting circuit is selectively configured to enable the controller.

15 Claims, 3 Drawing Sheets

POWER SUPPLY DEVICE

CROSS REFERENCE TO RELATED APPLICATIONS

This application claims priority of Taiwan Patent Application No. 108145272 filed on Dec. 11, 2019, the entirety of which is incorporated by reference herein.

BACKGROUND OF THE INVENTION

Field of the Invention

The disclosure generally relates to a power supply device, and more specifically, to a power supply device for avoiding burst damage.

Description of the Related Art

Power supply devices generally include fuses, which prevent the inner components of the power supply devices from being damaged by overload currents. However, burst high voltages can, within a very short time, burn out fuses, and as a result the corresponding power supply device may not generate any output voltage, thereby degrading the output stability of the power supply device. Accordingly, there is a need to propose a novel solution for solving the problems of the prior art.

BRIEF SUMMARY OF THE INVENTION

In a preferred embodiment, the invention is directed to a power supply device that includes an energy tank, a discharging and starting circuit, a fuse, a bridge rectifier, a transformer, a power switch element, an output stage circuit, and a controller. The energy tank includes an NTC (Negative Temperature Coefficient) thermistor. The energy tank generates a first induction voltage and a second induction voltage according to a first input voltage and a second input voltage. The discharging and starting circuit is coupled to the energy tank. The discharging and starting circuit includes a bypass path. When the resistance of the NTC thermistor is smaller than a threshold value, the bypass path is enabled, such that the energy tank is coupled through the bypass path to a ground and a ground voltage. The bridge rectifier is coupled through the fuse to the energy tank. The bridge rectifier generates a rectified voltage according to the first induction voltage and the second induction voltage. The transformer includes a main coil, a secondary coil, and an auxiliary coil. The main coil receives the rectified voltage. The secondary coil generates a transformation voltage. The main coil is coupled through the power switch element to the ground voltage. The power switch element is switched according to a clock voltage. The output stage circuit generates an output voltage according to the transformation voltage. The controller is coupled to the discharging and starting circuit. The controller generates the clock voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
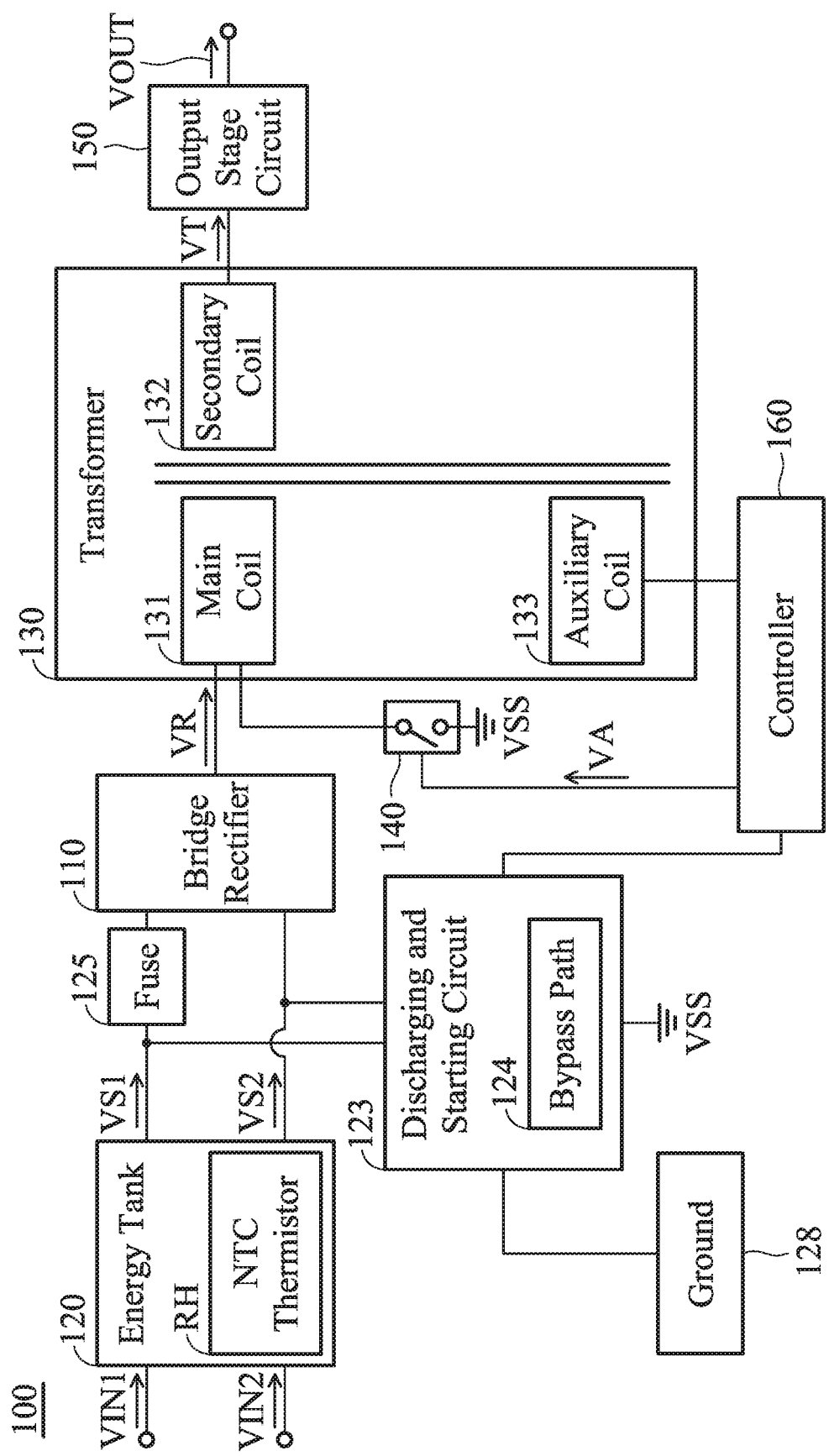
FIG. 1A is a diagram of a power supply device according to an embodiment of the invention.

FIG. 1A is a diagram of a power supply device 100 according to an embodiment of the invention. The power supply device 100 may be applied to a mobile device, such as a desktop computer, a notebook computer, or an all-in-one computer. As shown in FIG. 1A, the power supply device 100 includes a bridge rectifier 110, an energy tank 120, a discharging and starting circuit 123, a fuse 125, a transformer 130, a power switch element 140, an output stage circuit 150, and a controller 160. The energy tank 120 includes an NTC (Negative Temperature Coefficient) thermistor RH. The discharging and starting circuit 123 includes a bypass path 124, which is coupled to a ground 128 and a ground voltage VSS (e.g., 0V). The ground 128 may mean the earth or any grounding path coupled to the earth, and it is not an internal component of the power supply device 100. It should be noted that the power supply device 100 may further include other components, such as a voltage regulator and/or a negative feedback circuit, although they are not displayed in FIG. 1A.

Figure 1B:
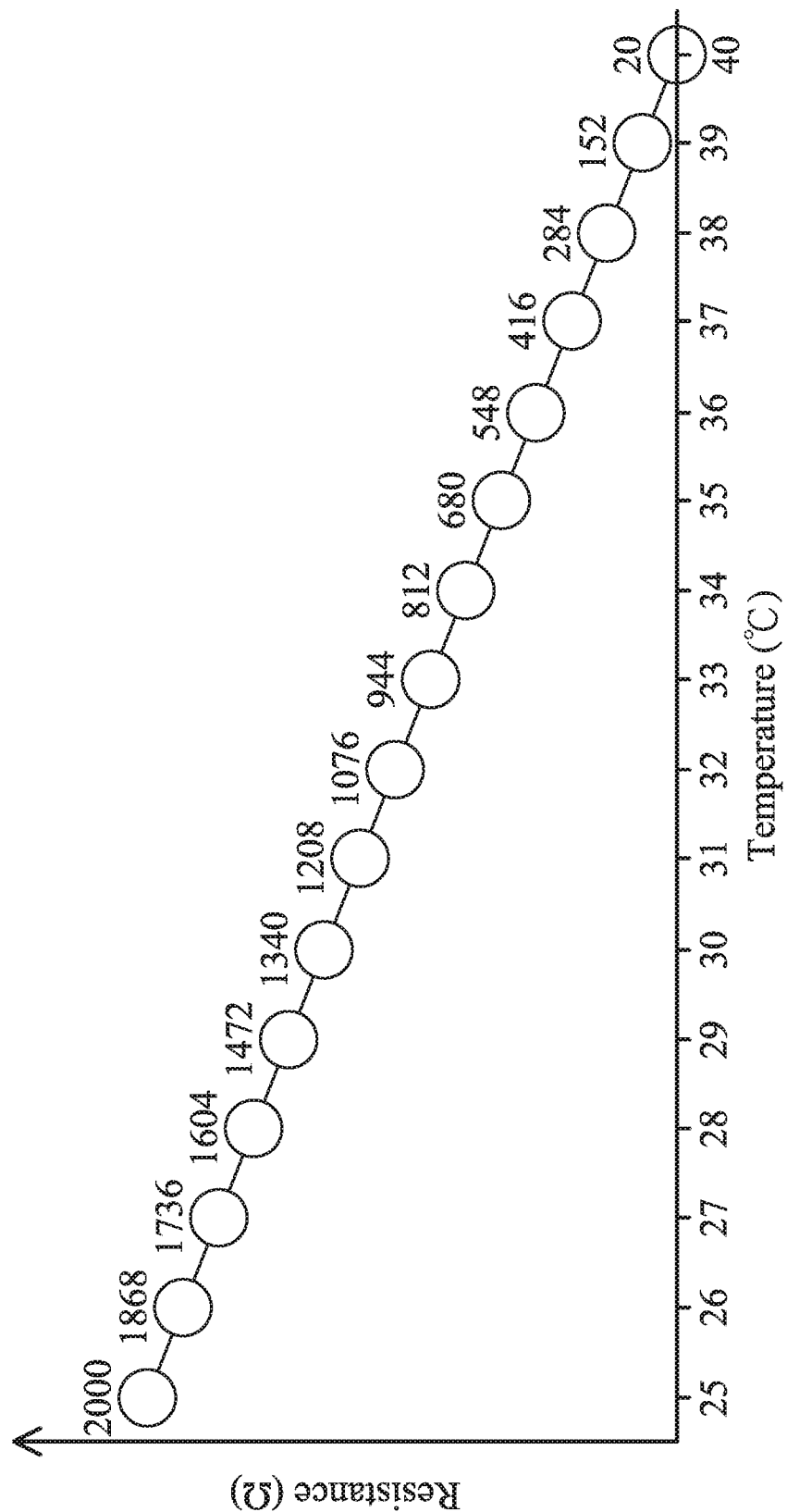
FIG. 1B is a diagram of operation characteristics of an NTC (Negative Temperature Coefficient) thermistor according to an embodiment of the invention.

FIG. 1B is a diagram of operation characteristics of the NTC thermistor RH according to an embodiment of the invention. The horizontal axis represents the temperature of the NTC thermistor RH, and the vertical axis represents the resistance of the NTC thermistor RH. According to the measurement of FIG. 1B, if the temperature of the NTC thermistor RH becomes higher, the resistance of the NTC thermistor RH will become smaller. For example, when the temperature is equal to 25°, the resistance of the NTC thermistor RH may be equal to 2 kΩ; however, when the temperature rises up to 40°, the resistance of the NTC thermistor RH may fall down to 20Ω (by about 99%).

The energy tank 120 generates a first induction voltage VS1 and a second induction voltage VS2 according to a first input voltage VIN1 and a second input voltage VIN2. Both the first input voltage VIN1 and the second input voltage VIN2 may come from an external power source. There may be an AC (Alternating Current) voltage difference formed between the first input voltage VIN1 and the second input voltage VIN2. The AC voltage difference may have any frequency and any magnitude. For example, the frequency of the AC voltage difference may be about 50 Hz or 60 Hz, and the RMS (Root-Mean-Square) value of the AC voltage difference may be about 110V or 220V, but they are not limited thereto. Furthermore, the energy tank 120 absorbs a burst high voltage, and then converts the burst high voltage into thermal energy. The bridge rectifier 110 is coupled through the fuse 125 to the energy tank 120. The bridge rectifier 110 generates a rectified voltage VR according to the first induction voltage VS1 and the second induction voltage VS2. The transformer 130 includes a main coil 131, a secondary coil 132, and an auxiliary coil 133. The main coil 131 and the auxiliary coil 133 may be positioned on the same side of the transformer 130. The secondary coil 132 may be positioned on the opposite side of the transformer 130. The main coil 131 receives the rectified voltage VR. In response to the rectified voltage VR, the secondary coil 132 generates a transformation voltage VT. In addition, the main coil 131 is coupled through the power switch element 140 to the ground voltage VSS. The power switch element 140 is switched according to a clock voltage VA, and it can alternatively be closed and opened. The output stage circuit 150 generates an output voltage VOUT according to the transformation voltage VT. The controller 160 generates the clock voltage VA. When the power supply device 100 is initialized, the clock voltage VA may be maintained at a constant voltage. When the power supply device 100 is normally operated, the clock voltage VA can provide a periodical clock waveform. It should be noted that the discharging and starting circuit 123 is coupled to the energy tank 120 and the controller 160. Initially, the temperature of the energy tank 120 is relatively low, and the bypass path 124 of the discharging and starting circuit 123 may be disabled (or opened). When the temperature of the energy tank 120 gradually becomes higher and the resistance of the NTC thermistor is smaller than a threshold value, the bypass path 124 of the discharging and starting circuit 123 may be enabled (or closed), such that the energy tank 120 is coupled through the bypass path 124 to the ground 128 and the ground voltage VSS. According to practical measurements, such a circuit design can prevent the fuse 125 of the power supply device 100 from being accidentally blown by a burst of high voltage, thereby improving the reliability of the power supply device 100.

The following embodiments will introduce the detailed structure and operation of the power supply device 100. It should be understood these figures and descriptions are merely exemplary, rather than limitations of the invention.

Figure 2:
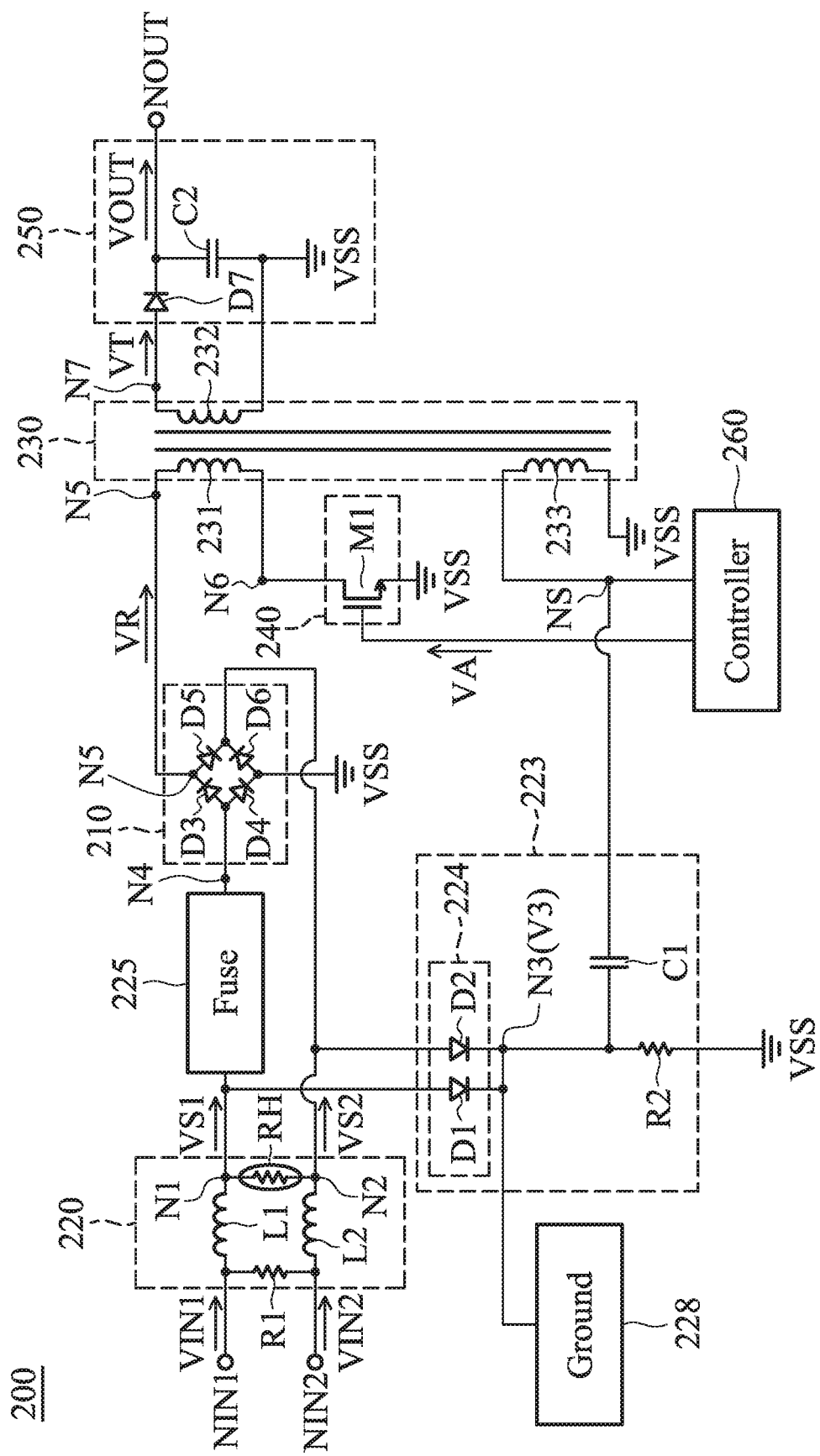
FIG. 2 is a diagram of a power supply device according to an embodiment of the invention.

FIG. 2 is a diagram of a power supply device 200 according to an embodiment of the invention. In the embodiment of FIG. 2, the power supply device 200 with a first input node NIN1, a second input node NIN2, and an output node NOUT includes a bridge rectifier 210, an energy tank 220, a discharging and starting circuit 223, a fuse 225, a transformer 230, a power switch element 240, an output stage circuit 250, and a controller 260. The energy tank 220 includes an NTC thermistor RH. The discharging and starting circuit 223 includes a bypass path 224 coupled to a ground 228 and a ground voltage VSS. The first input node NIN1 and the second input node NIN2 of the power supply device 200 are arranged for receiving a first input voltage VIN1 and a second input voltage VIN2 from an external power source, respectively. The output node NOUT of the power supply device 200 is arranged for outputting an output voltage VOUT to an electronic device (e.g., a notebook computer).

In addition to the NTC thermistor RH, the energy tank 220 may further include a first inductor L1, a second inductor L2, and a first resistor R1. The first inductor L1 has a first terminal coupled to the first input node NIN1, and a second terminal coupled to a first node N1 for outputting a first induction voltage VS1. The second inductor L2 has a first terminal coupled to the second input node NIN2, and a second terminal coupled to a second node N2 for outputting a second induction voltage VS2. The first resistor R1 has a first terminal coupled to the first input node NIN1, and a second terminal coupled to the second input node NIN2. The NTC thermistor RH has a first terminal coupled to the first node N1, and a second terminal coupled to the second node N2.

The bypass path 224 of the discharging and starting circuit 223 includes a first diode D1 and a second diode D2. The first diode D1 has an anode coupled to the first node N1, and a cathode coupled to a third node N3. The second diode D2 has an anode coupled to the second node N2, and a cathode coupled to the third node N3. The third node N3 may be further coupled to the ground 228. In addition to the bypass path 224, the discharging and starting circuit 223 may further include a second resistor R2 and a first capacitor C1. The second resistor R2 has a first terminal coupled to the third node N3, and a second terminal coupled to a ground voltage VSS. The first capacitor C1 has a first terminal coupled to the third node N3, and a second terminal coupled to a supply node NS of the controller 260. The controller 260 receives a supply voltage from its supply node NS. The controller 260 is selectively started or enabled according to the supply voltage.

The fuse 225 may be classified as a subminiature type, a resistance type, a ceramic tube type, or a glass tube type, and its type does not affect the performance of the invention. The fuse 225 has a first terminal coupled to the first node N1, and a second terminal coupled to a fourth node N4.

The bridge rectifier 210 includes a third diode D3, a fourth diode D4, a fifth diode D5, and a sixth diode D6. The third diode D3 has an anode coupled to the fourth node N4 for receiving the first induction voltage VS1, and a cathode coupled to a fifth node N5 for outputting a rectified voltage VR. The fourth diode D4 has an anode coupled to the fourth node N4, and a cathode coupled to the ground voltage VSS. The fifth diode D5 has an anode coupled to the fifth node N5, and a cathode coupled to the second node N2 for receiving the second induction voltage VS2. The sixth diode D6 has an anode coupled to the ground voltage VSS, and a cathode coupled to the second node N2.

The transformer 230 includes a main coil 231, a secondary coil 232, and an auxiliary coil 233. The main coil 231 and the auxiliary coil 233 may be positioned on the same side of the transformer 230. The secondary coil 232 may be positioned on the opposite side of the transformer 230. The main coil 231 has a first terminal coupled to the fifth node N5 for receiving the rectified voltage VR, and a second terminal coupled to a sixth node N6. The secondary coil 232 has a first terminal coupled to a seventh node N7 for outputting a transformation voltage VT, and a second terminal coupled to the ground voltage VSS. The auxiliary coil 233 has a first terminal coupled to the supply node NS, and a second terminal coupled to the ground voltage VSS.

The power switch element 240 includes a transistor M1. The transistor M1 may be an NMOS transistor (N-type Metal Oxide Semiconductor Field Effect Transistor). The transistor M1 has a control terminal for receiving the clock voltage VA, a first terminal coupled to the ground voltage VSS, and a second terminal coupled to the sixth node N6. The controller 260 generates the clock voltage VA. When the power supply device 200 is initialized, the clock voltage VA may be maintained at a constant voltage (e.g., the ground voltage VSS). When the power supply device 200 is normally operated, the clock voltage VA can provide a periodical clock waveform.

The output stage circuit 250 includes a seventh diode D7 and a second capacitor C2. The seventh diode D7 has an anode coupled to the seventh node N7 for receiving the transformation voltage VT, and a cathode coupled to the output node NOUT. The second capacitor C2 has a first terminal coupled to the output node NOUT, and a second terminal coupled to the ground voltage VSS.

In some embodiments, the operation principles of the power supply device 200 are described as follows. The power supply device 200 may operate in a first state, a second state, a third state, and a fourth state in order. First of all, in the first state, no energy is input to the first input node NIN1 and the second input node NIN2. At this time, the transistor M1 of the power switch element 240 and the controller 260 are both disabled.

In the second state, since the first input voltage VIN1 and the second input voltage VIN2 enter the first input node NIN1 and the second input node NIN2, the energy stored in the energy tank 220 is gradually increased. At this time, the temperature of the NTC thermistor RH gradually becomes higher, and the resistance of the NTC thermistor RH gradually becomes lower. It should be noted that the energy tank 220 can absorb a burst of high voltage and then convert the burst of high voltage into thermal energy, thereby reducing the probability of the fuse 225 being accidentally blown by the burst of high voltage. Furthermore, the first resistor R1 usually has a relatively high resistance, and it can avoid a short-circuited path formed between the first input node NIN1 and the second input node NIN2.

In the third state, when the temperature of the NTC thermistor RH is sufficiently high and the resistance of the NTC thermistor RH is smaller than a threshold value, the bypass path 224 of the discharging and starting circuit 223 is enabled, such that the energy tank 220 is coupled through the bypass path 224 to the ground 228 and the ground voltage VSS. That is, the energy stored in the energy tank 220 may be released through the turned-on first and second diodes D1 and D2 to the ground 228 and the ground voltage VSS. Specifically, when the first input voltage VIN1 is higher than the second input voltage VIN2, a first discharging path of the energy tank 220 is formed by the first diode D1. Conversely, when the second input voltage VIN2 is higher than the first input voltage VIN1, a second discharging path of the energy tank 220 is formed by the second diode D2.

In the fourth state, there is enough energy stored in the first capacitor C1 of the discharging and starting circuit 223 to start the controller 260. In other words, when the voltage V3 at the third node N3 is higher than a predetermined value, the controller 260 is started and enabled by the discharging and starting circuit 223. Next, the controller 260 can generate the clock voltage VA for alternatively closing and opening the transistor M1 of the power switch element 240, and thus the power supply device 200 is normally operated.

In some embodiments, the element parameters of the power supply device 200 are described as follows. The resistance of the first resistor R1 may be from 9.9 MΩ to 10.1 MΩ, such as 10 MΩ. The resistance of the second resistor R2 may be from 9.5 kΩ to 10.5 kΩ, such as 10 kΩ. The capacitance of the first capacitor C1 may be from 29.7 μF to 36.3 μF, such as 33g. The capacitance of the second capacitor C2 may be from 5600 μF to 8400 μF, such as 7000 μF. The inductance of the first inductor L1 may be from 285 μH to 315 μH, such as 300 μF. The inductance of the second inductor L2 may be from 285 μH to 315 μH, such as 300 μF. The turn ratio of the main coil 231 to the secondary coil 232 may be from 1 to 20, such as 10. The turn ratio of the main coil 231 to the auxiliary coil 233 may be from 1 to 20, such as 10. The aforementioned threshold value relative to the NTC thermistor RH may be about 20Ω (i.e., the temperature of the NTC thermistor RH may be about 40°). The aforementioned predetermined value relative to the voltage V3 at the third node N3 may be about 15V. The above ranges of parameters are calculated and obtained according to the results of many experiments, and they help to optimize the conversion efficiency and burst protection of the power supply device 200.

The invention proposes a novel power supply device including an energy tank and a discharging and starting circuit. According to practical measurements, the power supply device using the aforementioned design can reduce the probability of its fuse being accidentally blown by a burst of high voltage. Generally, the invention can significantly improve the output stability of the power supply device, and it is suitable for application in a variety of electronic devices.

Note that the above voltages, currents, resistances, inductances, capacitances and other element parameters are not limitations of the invention. A designer can adjust these parameters according to different requirements. The power supply device of the invention is not limited to the configurations of FIGS. 1-2. The invention may merely include any one or more features of any one or more embodiments of FIGS. 1-2. In other words, not all of the features displayed in the figures should be implemented in the power supply circuit of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A power supply device, comprising:
an energy tank, comprising an NTC (Negative Temperature Coefficient) thermistor, wherein the energy tank generates a first induction voltage and a second induction voltage according to a first input voltage and a second input voltage;
a discharging and starting circuit, coupled to the energy tank, and comprising a bypass path, wherein when a resistance of the NTC thermistor is smaller than a threshold value, the bypass path is enabled, such that the energy tank is coupled through the bypass path to a ground and a ground voltage;
a fuse;
a bridge rectifier, coupled through the fuse to the energy tank, wherein the bridge rectifier generates a rectified voltage according to the first induction voltage and the second induction voltage;
a transformer, comprising a main coil, a secondary coil, and an auxiliary coil, wherein the main coil receives the rectified voltage, and the secondary coil generates a transformation voltage;
a power switch element, wherein the main coil is coupled through the power switch element to the ground voltage, and the power switch element is switched according to a clock voltage;
an output stage circuit, generating an output voltage according to the transformation voltage; and
a controller, coupled to the discharging and starting circuit, and generating the clock voltage.

2. The power supply device as claimed in claim 1, wherein the energy tank further comprises:
a first inductor, wherein the first inductor has a first terminal coupled to a first input node for receiving the first input voltage, and a second terminal coupled to a first node for outputting the first induction voltage; and
a second inductor, wherein the second inductor has a first terminal coupled to a second input node for receiving the second input voltage, and a second terminal coupled to a second node for outputting the second induction voltage.

3. The power supply device as claimed in claim 2, wherein the energy tank further comprises:
a first resistor, wherein the first resistor has a first terminal coupled to the first input node, and a second terminal coupled to the second input node;
wherein the NTC thermistor has a first terminal coupled to the first node, and a second terminal coupled to the second node.

4. The power supply device as claimed in claim 3, wherein the bypass path of the discharging and starting circuit comprises:
a first diode, wherein the first diode has an anode coupled to the first node, and a cathode coupled to a third node.

5. The power supply device as claimed in claim 4, wherein the bypass path of the discharging and starting circuit further comprises:
a second diode, wherein the second diode has an anode coupled to the second node, and a cathode coupled to the third node;
wherein the third node is further coupled to the ground.

6. The power supply device as claimed in claim 5, wherein the discharging and starting circuit further comprises:
a second resistor, wherein the second resistor has a first terminal coupled to the third node, and a second terminal coupled to the ground voltage; and
a first capacitor, wherein the first capacitor has a first terminal coupled to the third node, and a second terminal coupled to a supply node of the controller.

7. The power supply device as claimed in claim 6, wherein when a voltage at the third node is higher than a predetermined value, the controller is enabled by the discharging and starting circuit.

8. The power supply device as claimed in claim 6, wherein the fuse has a first terminal coupled to the first node, and a second terminal coupled to a fourth node.

9. The power supply device as claimed in claim 8, wherein the bridge rectifier comprises:
a third diode, wherein the third diode has an anode coupled to the fourth node for receiving the first induction voltage, and a cathode coupled to a fifth node for outputting the rectified voltage;
a fourth diode, wherein the fourth diode has an anode coupled to the fourth node, and a cathode coupled to the ground voltage;
a fifth diode, wherein the fifth diode has an anode coupled to the fifth node, and a cathode coupled to the second node for receiving the second induction voltage; and
a sixth diode, wherein the sixth diode has an anode coupled to the ground voltage, and a cathode coupled to the second node.

10. The power supply device as claimed in claim 9, wherein the main coil has a first terminal coupled to the fifth node for receiving the rectified voltage, and a second terminal coupled to a sixth node.

11. The power supply device as claimed in claim 10, wherein the secondary coil has a first terminal coupled to a seventh node for outputting the transformation voltage, and a second terminal coupled to the ground voltage.

12. The power supply device as claimed in claim 11, wherein the auxiliary coil has a first terminal coupled to the supply node, and a second terminal coupled to the ground voltage.

13. The power supply device as claimed in claim 12, wherein the power switch element comprises:
a transistor, wherein the transistor has a control terminal for receiving the clock voltage, a first terminal coupled to the ground voltage, and a second terminal coupled to the sixth node.

14. The power supply device as claimed in claim 13, wherein the output stage circuit comprises:
a seventh diode, wherein the seventh diode has an anode coupled to the seventh node for receiving the transformation voltage, and a cathode coupled to an output node for outputting the output voltage; and
a second capacitor, wherein the second capacitor has a first terminal coupled to the output node, and a second terminal coupled to the ground voltage.

15. The power supply device as claimed in claim 7, wherein the threshold value is substantially equal to 20Ω, and the predetermined value is substantially equal to 15V.

* * * * *